(12) United States Patent
Weckerle et al.

(10) Patent No.: US 10,116,376 B2
(45) Date of Patent: *Oct. 30, 2018

(54) METHOD AND SYSTEM FOR RELAYING TELECOMMUNICATIONS SIGNALS

(71) Applicant: KATHREIN-Werke KG, Rosenheim (DE)

(72) Inventors: Martin Weckerle, Ulm (DE); Johannes Schlee, Ulm (DE); Christoph Kutscher, Ulm (DE)

(73) Assignee: KATHREIN-WERKE KG, Rosenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/503,303

(22) PCT Filed: Aug. 12, 2015

(86) PCT No.: PCT/EP2015/068578
§ 371 (c)(1),
(2) Date: Feb. 10, 2017

(87) PCT Pub. No.: WO2016/023955
PCT Pub. Date: Feb. 18, 2016

(65) Prior Publication Data
US 2017/0230101 A1    Aug. 10, 2017

(30) Foreign Application Priority Data

Aug. 12, 2014 (GB) .................. 1414280.6

(51) Int. Cl.
*H04B 7/145* (2006.01)
*H04W 16/26* (2009.01)
*H04W 88/08* (2009.01)

(52) U.S. Cl.
CPC ............ *H04B 7/145* (2013.01); *H04W 16/26* (2013.01); *H04W 88/085* (2013.01)

(58) Field of Classification Search
CPC ..... H04B 7/145; H04W 16/26; H04W 88/085
(Continued)

(56) References Cited

U.S. PATENT DOCUMENTS 7,761,093 B2   7/2010   Sabat, Jr. et al.
8,270,387 B2   9/2012   Cannon et al.
(Continued)

FOREIGN PATENT DOCUMENTS

EP        2387264       11/2011
WO     2012/058182       5/2012
(Continued)

OTHER PUBLICATIONS

GB Search Report issued in GB 1414280.6 dated Dec. 4, 2014.
International Search Report issued in PCT/EP15/68578 dated Nov. 9, 2015.

*Primary Examiner* — Hai V Nguyen
(74) *Attorney, Agent, or Firm* — Dann, Dorfman, Herrell and Skillman; Stephen Eland (57) ABSTRACT

The present invention describes a method and system for relaying telecommunication signals. The system comprises: a central hub connectable to one or more base stations; a plurality of remote units for relaying the telecommunication signals; and a plurality of expansion units digitally connected to the central hub and connectable to the plurality of remote units. At least one of the plurality of expansion units is provided with a plurality of coverage area modules, wherein one or more of the plurality of remote units is connected to a selected one of the plurality of coverage area modules, the selected one of the coverage area modules being adapted to relay the same signals to the connected one or more of the plurality of remote units.

12 Claims, 8 Drawing Sheets

(58) Field of Classification Search
USPC .......................................................... 455/7
See application file for complete search history.

(56) References Cited

U.S. PATENT DOCUMENTS

| | | | | |
|---|---|---|---|---|
| 8,346,091 | B2* | 1/2013 | Kummetz | ........... H04W 88/085 398/115 |
| 8,428,510 | B2 | 4/2013 | Stratford et al. | |
| 8,437,383 | B2 | 5/2013 | Wiwel et al. | |
| 8,462,683 | B2 | 6/2013 | Uyehara et al. | |
| 8,472,579 | B2 | 6/2013 | Uyehara et al. | |
| 8,509,215 | B2 | 8/2013 | Stuart | |
| 8,532,242 | B2* | 9/2013 | Fischer | ................. H04B 7/2606 375/356 |
| 8,681,917 | B2* | 3/2014 | McAllister | ............ H04J 3/0658 375/371 |
| 8,682,338 | B2 | 3/2014 | Lemson et al. | |
| 8,693,342 | B2* | 4/2014 | Uyehara | ................. H04B 7/024 370/238 |
| 9,219,520 | B2* | 12/2015 | Uyehara | ................. H04B 7/024 |
| 9,312,941 | B2* | 4/2016 | Soriaga | ............ H04B 7/0691 |
| 9,420,542 | B2* | 8/2016 | Henia | ............ H04B 10/25753 |
| 9,603,096 | B2* | 3/2017 | Weckerle | ........... H04W 52/0274 |
| 9,730,058 | B2* | 8/2017 | Wagner | .................. H04K 3/825 |
| 9,730,228 | B2* | 8/2017 | Harel | .................... H04B 7/024 |
| 9,775,123 | B2* | 9/2017 | Harel | .................... H04W 52/52 |
| 9,788,279 | B2* | 10/2017 | Henia | ............ H04B 10/25753 |
| 2002/0142739 | A1* | 10/2002 | Smith | ................. H04L 27/2618 455/103 |
| 2005/0243785 | A1 | 11/2005 | Sabat, Jr. et al. | |
| 2009/0316609 | A1 | 12/2009 | Singh | |
| 2010/0278530 | A1* | 11/2010 | Kummetz | ........... H04W 88/085 398/41 |
| 2011/0143649 | A1* | 6/2011 | Sabat, Jr. | ............... H04W 16/14 455/3.01 |
| 2011/0243291 | A1* | 10/2011 | McAllister | ............ H04J 3/0658 375/376 |
| 2012/0027145 | A1* | 2/2012 | Uyehara | ............... H04J 3/0685 375/356 |
| 2012/0106657 | A1* | 5/2012 | Fischer | ................. H04B 7/2606 375/259 |
| 2013/0051278 | A1 | 2/2013 | Watkins et al. | |
| 2013/0195467 | A1 | 8/2013 | Schmid et al. | |
| 2013/0201916 | A1 | 8/2013 | Kummetz et al. | |
| 2014/0219140 | A1* | 8/2014 | Uyehara | ................. H04B 7/024 370/278 |
| 2016/0050630 | A1* | 2/2016 | Weckerle | ........... H04W 52/0274 370/311 |
| 2016/0219444 | A1* | 7/2016 | Tsaregorodtsev | ..... H04W 24/02 |
| 2016/0248473 | A1* | 8/2016 | Weckerle | ........... H04W 52/0203 |
| 2016/0373923 | A1* | 12/2016 | Wagner | .................. H04K 3/825 |
| 2017/0156077 | A1* | 6/2017 | Schlee | ............ H04W 52/0206 |

FOREIGN PATENT DOCUMENTS

| | | |
|---|---|---|
| WO | 2013/063025 | 5/2013 |
| WO | 2013/070614 | 5/2013 |
| WO | 2014/026005 | 2/2014 |

\* cited by examiner

Fig. 4A (for cell distribution of figures 3A/3B)

Fig. 4B (for cell distribution of figure 3C)

METHOD AND SYSTEM FOR RELAYING TELECOMMUNICATIONS SIGNALS

CROSS REFERENCE TO RELATED APPLICATIONS

This application is related to co-pending UK Application No 1414288.9 entitled "Distribution system and method for managing power consumption of such a distribution system" and filed on 12 Aug. 2014 and to co-pending UK Application No 1414283.0 entitled "Method and system for relaying telecommunications signals with efficient joint capacity" and filed on 12 Aug. 2014. This application further claims priority and benefit of UK Application No 1414280.6 entitled "Method and system for relaying telecommunications signals" and filed on 12 Aug. 2014.

SUMMARY OF THE INVENTION

The present invention relates to a method and system for relaying telecommunications signals.

BACKGROUND OF THE INVENTION

The use of mobile telecommunications networks has increased substantially over the two decades. Network operators of the mobile telecommunications networks have increased the number of base stations in order to meet an increased demand for service by users of the mobile telecommunications networks. The network operators of the mobile telecommunications network need to reduce the running costs of the base station as well as improve the coverage of the base station. One option to do this is to implement systems for relaying the telecommunications signals of the mobile communication network as a distributed antenna system (DAS).

The telecommunications standards typically provide a plurality of channels or frequency bands useable for an uplink communication from the handset to the radio station as well as for a downlink communication from the radio station to the handset.

For example, the communication standard "Global System for Mobile Telecommunications (GSM)" for mobile telecommunications uses different frequencies in different regions. In North America, GSM operates on the primary mobile communication bands 850 MHz and 1900 MHz. In Europe, Middle East and Asia most of the providers use 900 MHz and 1800 MHz bands.

The constantly increasing capacity demand in wireless telecommunications and the fact that about 80% of the traffic on the mobile communication system is generated indoors requires new methods to provide flexible signal relaying systems to enable an efficient spectrum usage. When indoor traffic is handled with a pure outdoor macro coverage solution, the signal penetration and the signal quality is poor in the indoor environment. Indoor coverage solutions with distributed antenna systems help overcome this issue, but the increasing capacity demands require more advanced indoor solutions beyond pure coverage systems Active distributed antenna systems (DAS) or micro C-RAN have been developed to improve the coverage indoors. Theses systems have the capability of dynamic traffic/cell switching. The radio frequency (RF) signals in the DAS are communicated between a central hub and a plurality of remote units. The central hub is connected to one or more of the base stations.

In the DAS, the coverage of a single cell is not necessarily provided by a single one of the remote units. The term "cell" is used in the present disclosure according to the definition used for GSM and is equivalent to the definition of a sector in case of UMTS and LTE standards. The cell describes a single carrier or a multicarrier signal provided by a base station and which is typically relayed into a sector. The plurality of the remote units relay the same telecommunication signal of the cell throughout the coverage area of the cell. The coverage area of the cell is defined by the sum of the individual coverage areas of each ones of the remote units, which are assigned to the cell. In case a plurality of antennas is connected to at least one remote units the coverage area of the cell is the sum of the individual antenna coverage areas connected to the at least one remote unit assigned to the cell.

There is also a demand for sharing of the DAS between multiple mobile telecommunications network operators to reduce the costs for each individual network operator. Hence, the DAS needs to be able to efficiently combine the RF signals from the multiple network operators and to route the RF signals to one or more of the individual remote units. Ideally, the DAS has to deal with different requests from the different network operators regarding the cell structures and network design and optimization. Furthermore, the DAS needs to share power in the remote unit between the different network operators independently of the number of carriers used by each individual network operator.

The DAS may be used to provide coverage and capacity inside a building, as well as coverage and capacity in metropolitan or campus areas.

Document U.S. Pat. No. 7,761,093 B2 describes a method and system allowing multiple providers to share the same DAS. Each network operator's base station signal is digitized and can be routed to any digital remote unit at which the signal can be |[mw1] combined with any other signal from a different network operator within the same frequency band or another frequency band supported by the remote unit. Therefore, the digitally transmitted signals are then converted to analog RF signals in the remote unit and finally relayed into the coverage area of the remote unit.

The system described in document '093 provides for a full flexibility in assigning individual coverage areas of remote units or the sum of antenna coverage areas associated to a remote unit or portions of the system coverage area to different cells of the different network operators. However, this flexibility is only possible in full digital DAS systems. Full digital systems are expensive, as the digital systems require costly digital transceiver per remote unit, which are typically implemented per mobile radio frequency band.

U.S. Pat. No. 7,761,093 B2 also describes reassigning individual remote unit coverage areas to a different cell, for example for load balancing or network optimization. This is known as dynamic cell switching allowing. However, the system described in '093 cannot deal with inhomogeneous loads within the coverage area of one cell without changing the coverage area of the cell.

Furthermore, in a full digital DAS system the multiple signals from the different connected operator base stations need to be combined in order to relay the signals jointly into the cells. Multiple ones of the different operators typically own different spectral segments of the operating frequency band. Since these different spectral segments may comprise a single carriers or multiple carriers these different spectral segment can be considered to be carrier bundles in the following description. The operators are transmitting exclusively their carrier signals in the corresponding carrier bundles. Multi-operator DAS systems are expected to combine these different carrier bundles or the individual carrier signals owned by the operators prior to transmission via a common antenna that is common to all of the operators. This combination can either be done in an antenna combiner, as described in '093 (see FIG. 4) or the combination is implemented in the digital domain within the remote unit, as described in U.S. Pat. No. 8,682,338 B2.

The combining in the analog domain, after power amplification, as described in '093 will have an impact on power efficiency of the radio access node, due to the loss of the combiner. The digital combination of all carriers or carrier bundles of multiple operators within the remote unit as described in U.S. Pat. No. 8,682,338 B2 results in high digital signal processing complexity within each RU. The high costs for each remote unit will effect in total the cost of the system.

Hybrid systems comprising a digital sub-system and an analog sub-system have been proposed to reduce the costs. The hybrid system generally comprises a base station connected to a central hub either via its RF port or a digital port (e.g. CPRI, ORI, or digital interfaces like S1 for LTE or Iub/Iuh in case of UMTS, if the central hub comprises the corresponding base band signal processing unit). The RF signal is captured and digitized at the central hub and provided via a digital link to an expansion hub. The signal is converted in the expansion hub from the digital domain to the analog domain and further relayed to a plurality of the remote units. Document U.S. Pat. No. 8,428,510 describes an example of such hybrid systems. However, the system described in document U.S. Pat. No. 8,428,510 does not provide a solution for efficient routing for multiple network operators.

SUMMARY OF THE INVENTION

The present disclosure teaches a system for relaying telecommunication signals, comprising: a central hub connectable to one or more base stations; a plurality of remote units for relaying the telecommunication signals; and a plurality of expansion units digitally connected to the central hub and connectable to the plurality of remote units. At least one of the plurality of expansion units is provided with a plurality of coverage area modules, wherein one or more of the plurality of remote units is connected to a selected one of the plurality of coverage area modules. The selected one of the coverage area modules is adapted to relay the same signals to the connected one or more of the plurality of remote units.

It will be understood that the expansion hub can be co-located with the central hub or it can be even a part of the central hub By providing a plurality of coverage area modules for passing the same signals to the connected remote units, a flexible and reconfigurable distribution system supporting multi-network operator routing can be provided.

In the present disclosure the coverage area is defined as an area in which an identical signal is relayed by one or more remote units. The coverage area may correspond to a single defined cell of one of the telecommunications systems served by the central hub. Different coverage areas may represent different cells or a singe cell may be expanded to cover multiple areas. Similarly different coverage areas may be expanded over a single cell.

On one aspect of the invention, the coverage area module outputs an RF signal to be relayed to a reconfigurable number of remote units. The term coverage area is used to define a logical area receiving the same RF signal with selected carriers. The skilled person will understand that the coverage area modules within the expansion units may be configured as logical modules only and not present as a separate physical unit as such.

In an other aspect to the invention, the coverage area module outputs a digital wideband signal to be relayed to a reconfigurable number of remote units.

In an aspect of the disclosure, a connection between the plurality of expansion units and the plurality of remote units is reconfigurable, and so that at least one of the remote units may be connected from a first selected one of the coverage area modules, to a second selected one of the coverage area modules. By providing a reconfigurable connection between the expansion units and the remote units, the system can be reconfigured to meet the current capacity demand.

In a further aspect of the disclosure, a number of coverage area modules is less than a number of remote units. In case of a RF signal output at the coverage area, this allows minimizing the costs of the system, since less transceivers as remote units are required between the coverage area modules and the remote units. In the case of digital wideband signals, this allows reducing the costs of the system, since the complex digital signal processing required for combination of the output signal in not needed in each ones of the remote units.

In another aspect of the disclosure, the central hub is adapted to define at least one carrier bundle from ones of the telecommunication signals and to pass the at least one carrier bundle to at least one of the coverage areas modules. A carrier bundle may comprise a carrier, a plurality of carriers or even a group of multiple carriers jointly processed. A carrier bundle may be assigned to one or more coverage areas and therefore coverage modules. The assignment and parametrization of the carrier bundle is independent for each carrier bundle.

In yet another aspect of the disclosure, the system comprises a plurality of gain units for weighting the relative gain of signals between the central hub and the plurality of expansion units. The telecommunications signals and/or the respective carriers may be amplified or attenuated between the central hub and the expansion units. This individual power setting allows e.g. a seamless switching between cells. Variable gain units may—in other words—enable relative gain to be applied to the carrier bundles of the telecommunications signals from different ones of the network operators within the same frequency band to ensure e.g. a constant or defined power share among the different ones of the network operators, regardless of the number of carriers allocated by the network operators.

The present disclosure further teaches a method of relaying telecommunication signals comprises: receiving telecommunications signals from at least one network operator by a central hub; generating one or more carrier bundles of the telecommunications signals in the central hub; passing the one or more defined carrier bundles to a plurality of expansion units; associating a passed one of the defined carrier bundles with at least one coverage areas; and passing the carrier bundle to remote units (for relaying of the radio signals to the associated coverage area.

In one aspect of the disclosure, the associating of the passed one of the defined carried bundles (with an associated coverage area) is carried out in the digital domain. This enables a full reconfigurable association, whereby any carrier bundle can be associated to any coverage area.

In an aspect of the disclosure, at least one of the carrier bundles comprise telecommunications signals from a plurality of the network operators. This method therefore provides multi-network operator routing.

In yet another aspect of the disclosure the method comprise applying a relative gain to at least one of the carrier bundles and/or the respective carriers.

In a further aspect of the disclosure, the method comprises applying a gain to the relayed radio signals.

These and other aspects of the invention will be apparent from and elucidated with reference to the embodiment(s) described hereinafter.

DETAILED DESCRIPTION OF THE INVENTION

The invention will now be described on the basis of the drawings illustrating preferred embodiments. It will be understood that the embodiments and aspects of the invention described herein are only examples and do not limit the protective scope of the claims in any way. The invention is defined by the claims and their references. It will be understood that features of one aspect or embodiment of the invention can be combined with a feature of a different aspects or aspects and/or embodiments of the invention.

Figure 1A:
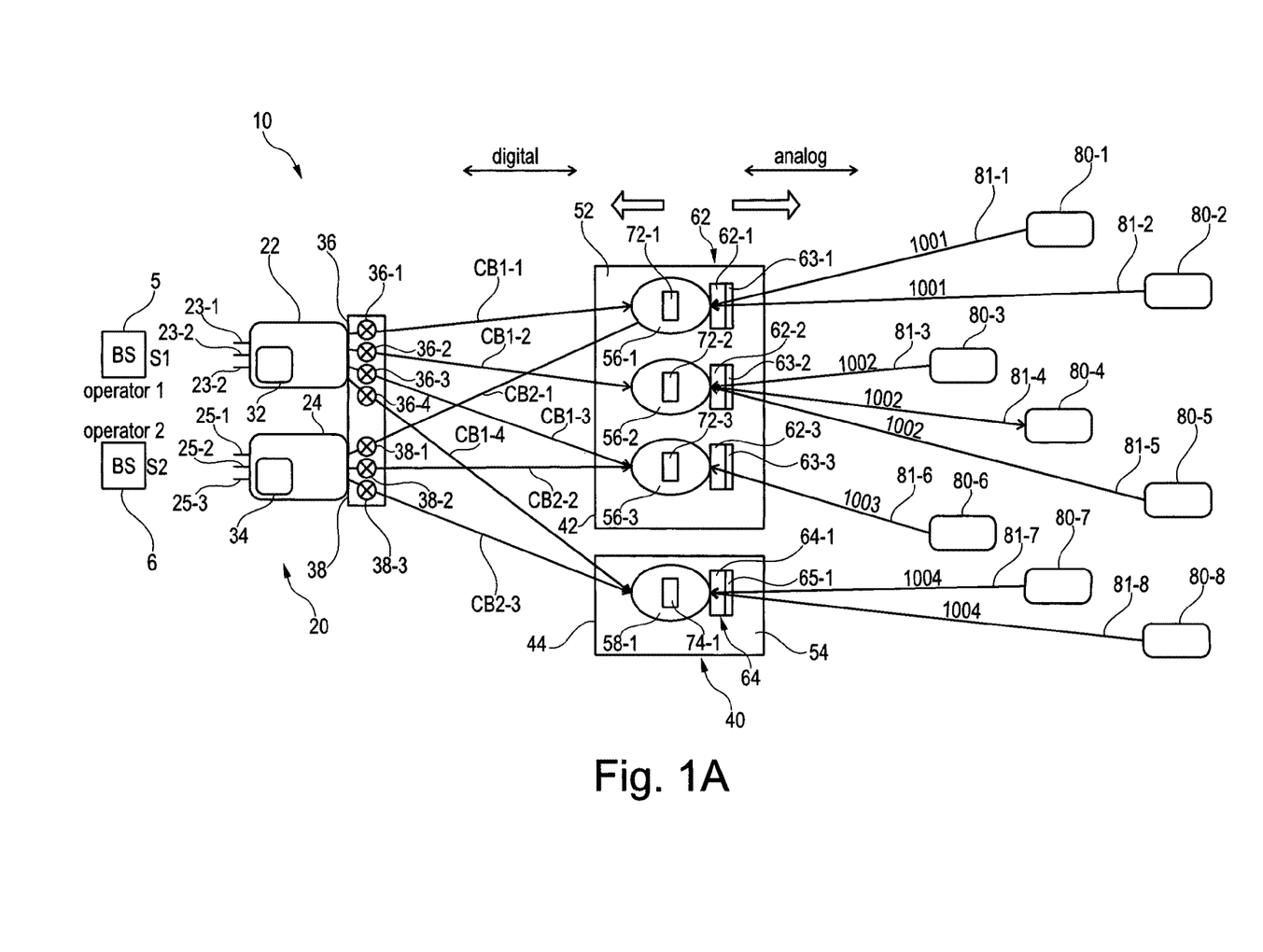
FIG. 1A shows an overview of a system according to a first embodiment of the present invention.

FIG. 1A shows an overview of a system 10 for routing a plurality of communication signals from at least two base stations 5, 6 to a plurality of remote units 80-1, ..., 80-M, according to an aspect of the disclosure.

The system 10 comprises an aggregation system or a central hub 20, connected to the base stations 5, 6 and a distribution system 40 connected to the remote units 80-1, ..., 80-M.

In the example of FIG. 1, there are eight remote units 80-1, ..., 80-8, but this is a non limiting example.

The central hub 20 comprises at least a first hub module 22 and a second hub module 24. The first hub module 22 has a first plurality of first ports 23-1, 23-2, 23-3 connected to a first base station 5, and the second hub module 24 has a second plurality of second ports 25-1, 25-2, 25-3 connected to at a second base station 6. The number of the first ports 23-1, 23-2, 23-3 and the second ports 25-1, 25-5, 25-3 is not limiting of the invention.

The first hub module 22 and the second hub module 24 are shown as two separate modules on FIG. 1 in an exemplary configuration. This configuration is not limiting the invention and the central hub 20 may comprise a single module with the first plurality of first ports 23-1, 23-2, 23-3 connectable to the first base station 5 and the second plurality of second ports 25-1, 25-2, 25-3 connectable to the second base station 6. Alternatively, signals from the first base station 5 and the second base stations 6 may be combined, in the analog domain, and passed to a single port of the central hub 20.

The first base station 5 and the second base station 6 are adapted for processing telecommunication signals to and from one or more network operators.

The plurality of the first ports 23-1, 23-2, 23-3 and the second ports 25-1, 25-5, 25-3 support either a digital connection with the baseband or the radio access network, or a radio frequency (RF) connection.

The first hub module 22 and the second hub module 24 comprise respectively a first front end module 32 and a second front end module 34. The first hub module 22 processes incoming or outgoing first signals S1 at the first input ports 23-1, 23-2, 23-3 and the second hub module process incoming or outgoing second signals S2 from the second input ports 25-1, 25-2, 25-3.

The first front end module 32 and second front end module 34 include a digital to analog converter, if the first input signals S1 and the second input signals S2 are in the analog domain. The first front end module 32 and second front end module 34 generate respectively from the first input signals S1 and the second input signals S2 in the analog domain a first plurality of first carrier bundles CB1-1, ..., CB-N1 from the first input signals S1 and second plurality of second carrier bundles CB2-1, ... CB2-N2 from the second input signals S2 in the digital domain. Alternatively the different carrier bundles can also be set up out of both signals S1 and S2.

The first input signals S1 and the second input signals S2 may comprise a plurality of carriers, depending on the network operators. The first input signals S1 may be, for example, signals in a first frequency band, whilst the second input signals S2 may be assigned a second frequency band. The first input signals S1 and the second input signals S2 may use different protocols, including but not limited to GSM, UMTS, LTE, IEEE 802.1, if applicable with MIMO functionality and/or separate MIMO protocols.

The first carrier bundle CB1-1, ..., CB-N1 and the second carrier bundle may comprise a plurality of first input signals S1 of different frequencies and/or protocols and the second carrier bundle CB2-1, ... CB2-N2 may comprise second input signals S2 of other different frequencies and/or protocols. All of the first input signals S1 and the second input signals S2 in the respective first carrier bundle CB1-1, ..., CB-N1 or the second carrier bundle CB2-1, ... CB2-N2 are jointly processed. The skilled person will understand that the carrier bundles CB1-1, ..., CB-N1 and CB2-1, ... CB2-N2 may comprise only a first input signal S1 and a second input signal S2 of only one carrier and frequency.

In the example shown in FIG. 1, there are four first carrier bundles (N1=1 to 4) and three second carrier bundles (N2=1 to 3). This is a non-limiting example. The first front end module 32 and second front end module 34 may be configured to generate up to six carrier bundles (CB1, ... CB-6) out of the signals at the three ports. However, this is not a limiting example.

The number N1 and composition of first carrier bundles CB1-1, ..., CB-N1 and the number N2 and composition of second plurality of second carrier bundles CB2-1, ... CB2-N2 may be modified, as will be explained later with reference to FIG. 2.

The first hub module 22 and the second hub module 24 comprise respectively a first gain module 36, with a plurality of first variable gain units 36-1, . . . , 36-N1, and a second gain modules 38, with a plurality of second variable gain units 38-1, 38-N2.

A separate one of the first variable gain units 36-1, . . . , 36-N1 is provided for each of the first carrier bundles CB1-1, . . . , CB1-N1 and a separate one of the second variable gain units 38-1, . . . , 38-N1 is provided for each of the second carrier bundles CB2-1, . . . , CB2-N2. The first gain units 36-1, . . . , 36-N1 are adapted to adjust the first input signal S1 in one of the first carrier bundles CB1-1, . . . , CB1-N1, and the second variable gain units 38-1, . . . , 38-N1 are adapted to adjust the second input signal S2 in one of the second carrier bundles CB2-1, . . . , CB2-N2. The first gain modules 36 and the second gain modules 38 therefore enable an independent individual gain adjustment of the first input signal S1 and the second input signal S2 in each of the first carrier bundles CB1-1, . . . , CB1-N1 and the second carrier bundles CB2-1, . . . , CB2-N2.

The first gain modules 36 and the second gain modules 38 are digitally connected to the distribution system 40.

The connection between the central hub 20 and the distribution system 40 is in the digital domain. This allows different kinds of routing capability, carrier bundles and individual gain adjustment in a highly flexible manner.

The distribution system 40 comprises at least one expansion unit 42, 44 connected to the plurality of remote units 80-1, . . . 80-M. The first expansion unit 42 has a first switch unit 52 followed by a first digital-to-analog converter (DAC) 62. The second expansion unit 44 has a second switch unit 54 followed by a second digital-to-analog converter 64.

The first switch unit 52 and the second switch unit 54 are each adapted to define a predefined number M of first coverage areas modules 56-1, . . . , 56-M and second coverage area modules 58-1, . . . , 58-M. Each one of the coverage area modules 56-1, . . . , 56-M, 58-1, . . . , 58-M is associated to a coverage area.

The coverage area is defined as an area in which an identical signal is relayed by one or more remote units 80-1 to 80-N. The coverage area may correspond to a single defined cell of one of the communication systems served by the central hub 20. Different coverage areas may represent different cells or a single cell may expanded to cover multiple coverage areas. Similarly, different coverage areas may be expanded over a single cell. In one aspect of the invention as will be explained in the present disclosure, the coverage area module 56-1, . . . , 56-M, 58-1, . . . , 58-M outputs an RF signal to be relayed to a reconfigurable number of remote units 80-1 to 80-N. In other words, the remote unit 80-1 to 80-N assigned to the coverage area will be connected to the corresponding one of the first coverage area module 56-1, . . . , 56-M or the second coverage area module 58-1, . . . , 58-M and will therefore receive the same coverage area module rf signal $S_{CA}$.

In order to generate the RF signal to be relayed, a combination of the carrier bundles CB is implemented in the digital domain. Therefore, the data stream of the individual carrier bundle assigned to this coverage area and received as baseband digital data streams by the first coverage area module 56-1, . . . , 56-M, and/or the second coverage area module 58-1, . . . , 58-M are up sampled, followed by a frequency shift to the original carrier bundle frequency, which corresponds to the spectral segment of the network operator (see above), and finally combined to form a digital wideband signal covering the entire operating frequency band. The digital wideband signal is than digital to analog converted (first coverage area module 56-1, . . . , 56-M, and/or the second coverage area module 58-1, . . . , 58-M).

This operation of digital to analog conversion is done for the digital wideband 1[mw2] signals in each of the operating frequency bands supported by the coverage area. The resulting multiple RF signals of the multiple supported operating frequency bands are combined in order to generate a coverage area RF signal. In case of multi-operator and multi-band operation the coverage area RF signal represents therefore the combination of all carrier bundle signals that are assigned to this coverage area across the entire individual operating frequency band and across all supported operating frequency bands of the coverage area.

In another aspect of the invention, the coverage area module 56-1, . . . , 56-M, 58-1, . . . , 58-M outputs a digital wideband signal to be relayed to a reconfigurable number of remote units 80-1 to 80-N. In other words, the remote unit 80-1 to 80-N assigned to the coverage area will be connected to the corresponding one of the first coverage area module 56-1, . . . , 56-M or the second coverage area module 58-1, . . . , 58-M and will therefore receive the same coverage area module digital wideband signal $S_{CA-D}$. In this other aspect of the invention the digital wideband signal is a digital representation of the RF signal that is described above as the possible output of a coverage area in the one aspect of the invention. The digital to analog conversion of the digital wideband signal is in this aspect not realized in the first coverage area module 56-1, . . . , 56-M, and/or the second coverage area module 58-1, . . . , 58-M but in the remote units 80-1 to 80-N. Therefore, each digital wideband signal represents each supported operating frequency band. In case of multiple operating frequency bands that are supported by the coverage area the individual digital wideband signals are transmitted as individual digital data streams to the remote units 80-1 to 80-N assigned to the coverage area. The remote unit 80-1 to 80-N implements the digital to analog conversion of each individual digital wideband signal received from the coverage area and relays the generated RF signals.

The first switch unit 52 in FIG. 1A has three exemplary coverage areas modules 56-1, . . . , 56-3. The first coverage area module 56-1 is adapted to relay a first coverage signal 1001, the second coverage area module 56-2 is adapted to relay a second coverage signal 1002, and the third coverage area module 56-3 is adapted to relay a third coverage signal 1003

The second switch unit 54 has as an example a fourth coverage area module 58-1, which is adapted to relay a fourth coverage signal 1004.

In the example of FIG. 1, the first coverage signal 1001 is relayed to the first remote unit 80-1 and the second remote unit 80-2, via a first remote unit connection 81-1 and a second remote unit connection 81-2. The second coverage signal 1002 is relayed to the third remote unit 80-3, the fourth remote unit 80-4 and the fifth remote unit 80-5, via the third remote unit connection 81-3, the fourth remote unit connection 81-4 and the fifth remote unit connection 81-5. The third coverage signal 1003 is relayed to the sixth remote unit 80-6 via a sixth remote unit connection 81-6. The fourth coverage signal 1004 is relayed to the seventh remote unit 80-7 via a seventh remote unit connection 81-7 and to the eighth remote unit 80-8, via an eighth remote unit connections 81-8.

The first switch unit 52 and the second switch unit 54 serve the different first coverage area modules 56 and second coverage area modules 58 and are reconfigurable. The reconfiguration allows the different connections corresponding to the (re)assignments of the remote units 80-1 to 80-N and the carrier bundles CB to be made to the different ones of the coverage areas. The reconfiguration may be done depending on the capacity needs, as will be explained later with reference to FIG. 2. The first coverage area modules 56-1, ..., 56-M1 and the second coverage area modules 58-1, ..., 58-M2 are connectable to each of the remote units 80-1, ..., 80-N. On the other hand, one of the remote units 80-1 to 80-N is connectable to only a single one of the first coverage area modules 56-1, 56-M1 or the second coverage area modules 58-1, ..., 58-M2 at a time. For example, all of the remote units 80-1, ..., 80-N may be assigned to a single one of the coverage areas, or none of the remote units 80-1, ..., 80-N are connected to one of the first coverage area modules 56-1, ..., 56-M1 or the second coverage area modules 58-1, ..., 58-M2.

The remote unit connections 81-1, ..., 81-8 between the first coverage area modules 56-1, ..., 56-M1 and the second coverage area modules 58-1, ..., 58-M2 of the expansion units 52 and 54 and the remote units 80-1, ..., 80-N are in the analog domain in one aspect of the invention. The first coverage area modules 56-1, ..., 56-M1 and the second coverage area modules 58-1, ..., 58-M2 comprise a plurality of digital wideband signal generators per supported operating frequency band 72-1, ..., 72-M1 and plurality of digital wideband signal generators per supported operating frequency band 74-1, ..., 74-M2 followed by a plurality of first digital-analog-converters 62-1, ..., 62-M1 for each supported operating frequency band and second digital to analog converters 64-1, ..., 64-M2 for each supported operating frequency band followed by a first multi-band transceiver 63-1, 63-2, ..., 63-M1 or second multi-band transceiver 65-1, ..., 65-M2 for relaying the combined carrier bundles CB to the corresponding ones of the remote units 80-1, ..., 80-N. In the example of FIG. 1, the number M1 is equal to 3 and the number M2 is equal to 1.

The number of the first digital-to-analog converters 62-1, ..., 62-M1 and the second digital to analog converters 64-1, ..., 64-M2 and the number of the first transceivers 63-1, ..., 63-M1 and the second transceivers 65-1, ..., 65-M2 may be reduced in comparison to a full digital routing capability, since the total number of the first coverage areas modules 56-1, ..., 56-M1 and the second coverage area modules 58-1, ..., 58-M2 is less than the total number of remote units 80-1, ..., 80-N.

Figure 1B:
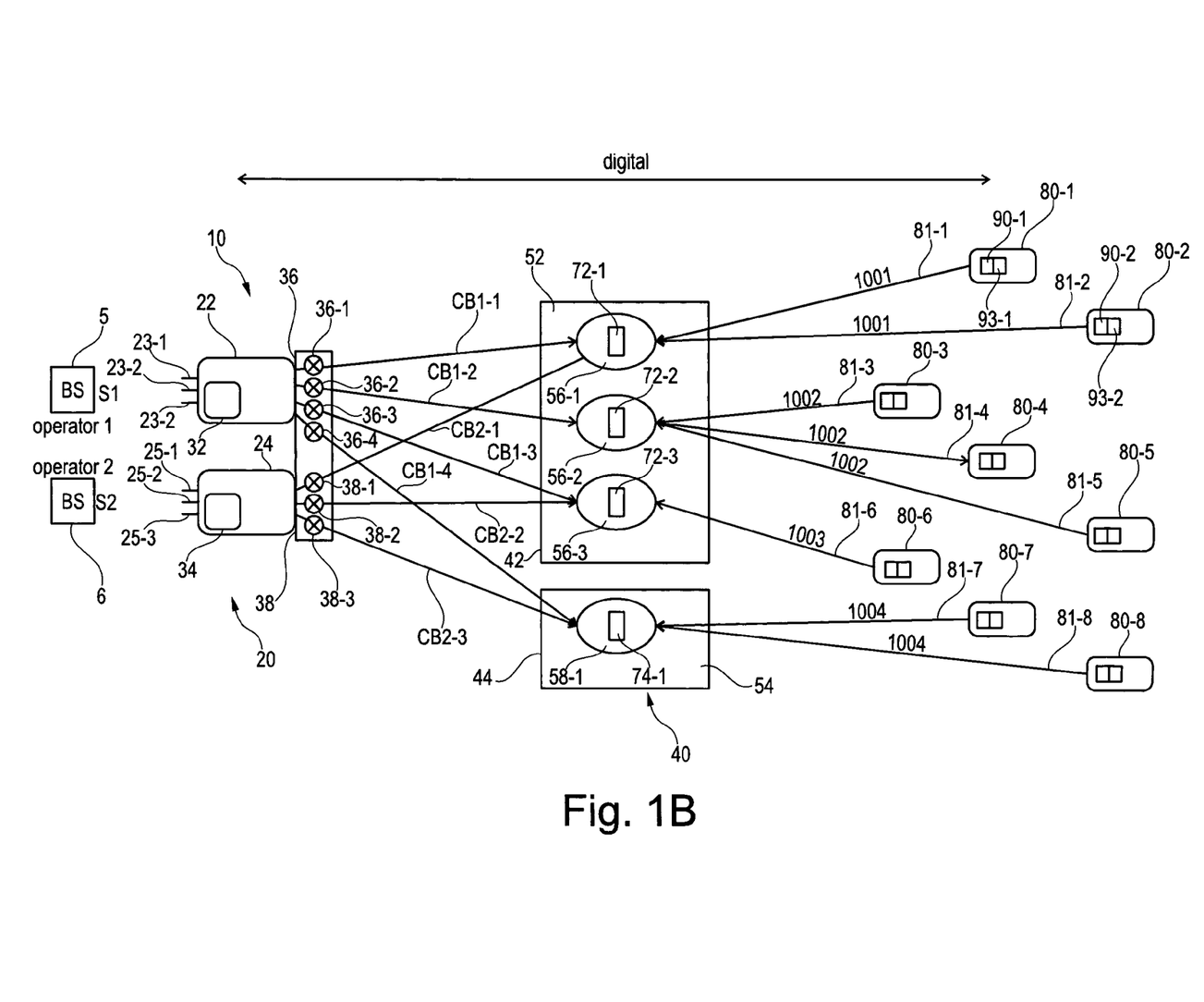
FIG. 1B shows an overview of a system according to a second embodiment of the present invention.

In another aspect of the invention, shown in FIG. 1B, the remote unit connections 81-1, ..., 81-8 between the first coverage area modules 56-1, ..., 56-M1 and the second coverage area modules 58-1, ..., 58-M2 of the expansion units 52 and 54 and the remote units 80-1, ..., 80-N are in the digital domain. It will be noted that like elements on FIG. 1B are identified with the same reference numerals as the same or similar elements on FIG. 1A. The first coverage area modules 56-1, ..., 56-M1 and the second coverage area modules 58-1, ..., 58-M2 comprise a plurality of digital wideband signal generators per supported operating frequency band 72-1, ..., 72-M1 and plurality of digital wideband signal generators per supported operating frequency band 74-1, ..., 74-M2. Each of the remote units 80-1, ... 80-8 comprise a plurality of digital-analog-converters 90-1, ..., 90-8 for converting the received digital wideband signals per operating frequency band followed by a multi-band transceiver 93-1, 93-2, ..., 93-8 for relaying the combined carrier bundles CB to the corresponding ones of the remote units 80-1, ..., 80-N. In the example of FIG. 1B, the number M1 is equal to 3 and the number M2 is equal to 1.

Instead of providing digitized version of the individual carrier bundles to each one of the remote units 80-1 to 80-N and instead of combining each carrier bundle signal within the remote unit 80-1 to 80-N, the remote units 80-1 to 80-N receive a pre-combined digital signal per supported operating frequency band. The effort for digital signal processing may be reduced in comparison to a full digital routing capability, since the total number of the first coverage areas modules 56-1, ..., 56-M1 and the second coverage area modules 58-1, ..., 58-M2 is less than the total number of remote units 80-1, ..., 80-N.

A processor is adapted to define, at a given time, which ones of the remote units 80-1, ..., 80-N should be assigned to which coverage area, i.e. which of the remote units 80-1, ..., 80-N should receive the same RF telecommunications signal. Alternatively, the processor could be adapted to reassign the remote units 80-1, ..., 80-N to different ones of the coverage areas based on externally triggering events. Such external triggering events include, but are not limited to, such detecting RF signal activity in an uplink or information about the network performance or capacity demand provided either from one of the base stations 5 or 6 station or the communication network, or by means to measure the network performance, such as load indications per cell.

Hence, each base station 5, 6 or baseband unit provides a plurality of carriers or a plurality of groups of multiple carriers providing telecommunications signals and these telecommunication signals are jointly processed.

The carrier bundles CB are passed to one of the first coverage area modules 56-1, ..., 56-M1 or the second coverage area modules 58-1, ..., 58-M2. Each of the plurality of remote units 80-1, ..., 80-N is assigned to a single one of the coverage area modules 56-1, ..., 56-M1, 58-1, ..., 58-M2. The carrier bundles are reconfigurable and may be redefined depending on the required coverage. For example, the a carrier bundle can be passed simultaneously to more than one of the first coverage area modules 56-1, ..., 56-M and of the second coverage area modules 58-1, ..., 58-M2. Similarly, two of the carrier bundles with the same signals or carriers may be passed to the same one of the first coverage area modules 56-1, ..., 56-M1 or the second coverage area modules 58-1, ..., 58-M2 module, with a same weight or with different weights applied by the corresponding one of the first variable gain units 36-1, ..., 36-N1 or the second variable gain unit 38-1, ..., 38-N1.

Figure 2:
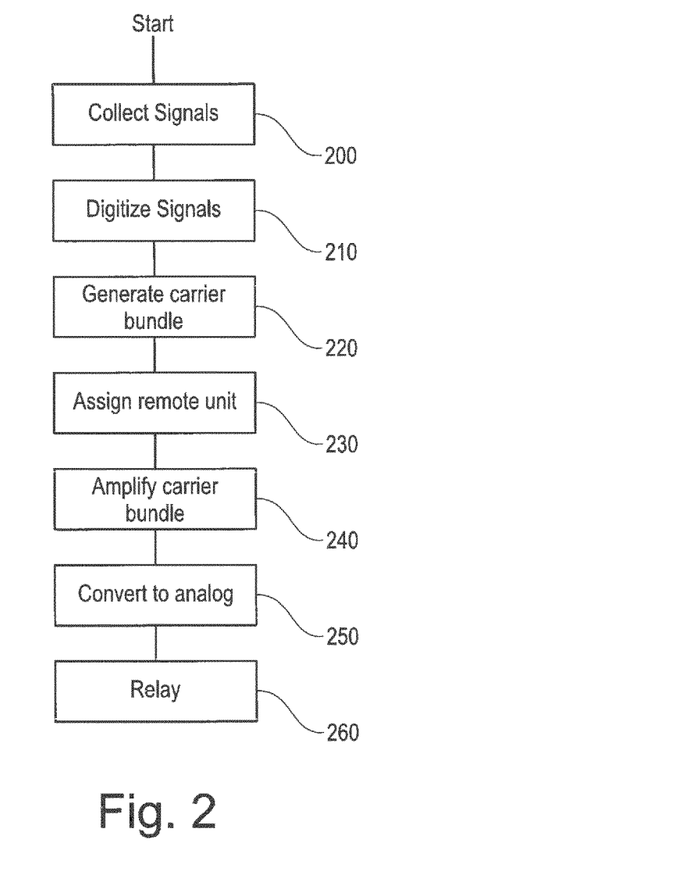
FIG. 2 shows a block diagram of a method according to an embodiment of the present invention.

FIG. 2 shows a workflow of a method of routing incoming signals according to an aspect of the present disclosure. The method is described with reference to the system of FIG. 1A.

In a first step 200, the first input signal S1 and the second input signal S2 are passed from the first base station 5 and/or the second base station 6 to the central hub 20.

The first front end module 32 and second front end module 34 are adapted to collect the first input signal S1 and the second input signal S2 and digitize the first input signals S1 and the second input signals S2 (when needed) in step 210 and generate four of the first carrier bundles CB1-1, CB1-2, CB1-3, CB1-4 from the first input signal S1 and three second carrier bundles CB2-1, CB2-2, CB2-3 from the second input signals S2 in step 220. Alternatively the different carrier bundles can also be set up out of both signals S1 and S2.

The first input signal S1 and the second input signal S2 may comprise a plurality of carriers, depending on the network operators.

A carrier bundle CB comprise a plurality of carriers or a plurality of groups of multiple carriers jointly processed, as noted above. The carrier bundle may comprise only one single carrier.

In the non-limiting example of FIG. 1, there are four first carrier bundles (N1=4) and three second carrier bundles (N2=3). The first front end module 32 and second front end module 34 may be configured to generate each up to six carrier bundles out of the incoming signals from the three input ports.

In a step 230, each of the remote units 80-1, . . . , 80-8 (N=8 in this non-limiting example) is assigned to a single one of the coverage area, and hence to one first coverage area module 56-1, . . . , 56-M1 or to one second coverage area module 58-1, . . . , 58-M2. The carrier bundles CB1-1, CB1-2, CB1-3, CB1-4, CB2-1, CB2-2, CB2-3 are also assigned to a coverage area and thus to an associated one of the first coverage area modules 56-1, . . . , 56-M1, and the second coverage modules 58-1, . . . , 58-M2.

In the example of FIG. 1, a first one CB1-1 of the first carrier bundles CB1-1 to CB1-4 and a first one CB2-1 of the second carrier bundles CB2-1 to CB2-3 are assigned to the first coverage area module 56-1. A second one CB1-2 of the first carrier bundles CB1-1 to CB1-4 is assigned to the second coverage module 56-2. A third one CB1-3 of the first carrier bundles CB1-1 to CB1-4 and a second one CB2-2 of the second carrier bundles CB2-1 to CB2-3 are assigned to the third coverage area module 56-3. A fourth one CB1-4 of the first carrier bundles CB1-1 to CB1-4 and a third one CB2-3 of the second carrier bundles CB2-1 to CB2-3 are assigned to the fourth coverage area module 56-3.

The assignment and parameterization of each of the carrier bundles CB1-1, CB1-2, CB1-3, CB1-4, CB2-1, CB2-2, CB2-3 can be done independently for each carrier bundle CB1-1, CB1-2, CB1-3, CB1-4, CB2-1, CB2-2, CB2-3 and therefore for each network operator/provider signal.

In the example of FIG. 1, each of the carrier bundles CB1-1, CB1-2, CB1-3, CB1-4, CB2-1, CB2-2, CB2-3 is assigned to a one of the first coverage area modules 56-1, . . . , 56-M or the second coverage area modules 58-1, . . . , 58-M2. module. This assignation is not limiting the invention and a carrier bundle CB1-1, CB1-2, CB1-3, CB1-4, CB2-1, CB2-2, CB2-3 can be passed simultaneously to more than one of the first coverage area modules 56-1, . . . , 56-M and of the second coverage area modules 58-1, . . . , 58-M2. Similarly, two or more carrier bundles of the first carrier bundles CB1-1, CB1-2, CB1-3 or of the second carrier bundles CB2-1, CB2-2, CB2-3 can carry the same signal and be passed to the same or to different coverage area modules, yet with different weight by the variable gain units 36-1, 36-2, 36-3 or 38-1, 38-2, 38-3.

It should be understood that a carrier bundle may comprise a single carrier, a plurality of carriers or a plurality of groups of multiple carriers jointly processed.

Each of the remote units 80-1, . . . , 80-8 is assigned to a single coverage area and hence to a single one of the first coverage area modules 56-1, 56-2, 56-3 or to the second coverage module 58-1. In the example of FIG. 1, the first remote unit 80-1 and the second remote units 80-2 are assigned to the first coverage area module 56-1. The third remote unit 80-3, the fourth remote unit 80-4 and the fifth remote unit 80-5 are assigned to the second coverage area 56-2, the sixth remote unit 80-6 is assigned to the third coverage area 56-3, and the seventh remote unit 80-7 and the eighth remote units 80-8 are assigned to the fourth coverage area 58-1.

In step 240, the carrier bundles CB1-1, CB1-2, CB1-3, CB1-4, CB2-1, CB2-2, CB2-3 are weighted by the corresponding first variable gain units 36-1, . . . , 36-4 and the second variable gain unit 38-1, and passed to the corresponding ones of the first coverage area modules 56-1, 56-2, 56-3, or the second coverage area module 58-1 in the first expansion hub 52 or the second expansion hub 54 of the distribution system 40.

As noted above, the first gain units 36-1, . . . , 36-4 and the second gain unit 38-1 provides for an independent individual gain adjustment of the carrier bundles CB1-1, CB1-2, CB1-3, CB1-4, CB2-1, CB2-2, CB2-3. The relative gain may be adjusted per carrier bundle CB1-1, CB1-2, CB1-3, CB1-4, CB2-1, CB2-2, CB2-3. The different carrier bundles CB1-1, CB1-2, CB1-3, CB1-4, CB2-1, CB2-2, CB2-3 can have different relative gains to ensure for example that the power share provided to each one of the network operators is the same, independent of the number of carriers used by each network operator. The relative gain could be also used to individually optimize the transmit power at the remote units 80-1, . . . , 80-N for each network operator.

The first gain units 36-1, . . . , 36-4 and the second gain unit 38-1 operate in the digital domain within the distribution system 40.

In step 250, the signals in the carrier bundles CB1-1, CB1-2, CB1-3, CB1-4, CB2-1, CB2-2, CB2-3 are converted by the digital-to-analog converters 62-1, 62-2, 62-3, 64-1 from the digital domain to the analog domain and relayed in step 260 to the remote units 80-1, . . . , 80-N assigned to the respective first coverage area modules 56-1, . . . , 56-M1 or the second coverage area modules 58-1, . . . , 58-M2. In an alternative aspect of the invention, the digital-to-analog converters 90-1, . . . , 90-8 are located in the remote unites 80-1, . . . , 80-N, rather than in the first coverage area modules 56-1, . . . , 56-M1 or the second coverage area modules 58-1, . . . , 58-M2.

In the example of FIG. 1, the first ones CB1-1 and CB2-1 of the first carrier bundle and the second carrier bundle are therefore relayed to the first remote unit 80-1 and the second remote unit 80-2. The second one CB1-2 of the first carrier bundle is relayed to all of the third remote unit 80-3, the fourth remote unit 80-4 and the fifth remote unit 80-3. The third one CB1-3 of the first carrier bundle and the second one CB2-2 of the second carrier bundle are relayed to the sixth remote unit 80-6. The fourth one CB1-4 of the first carrier bundle and the third one CB2-3 of the second carrier bundle are relayed to the seventh remote unit 80-7 and eighth remote unit 80-8.

The remote units 80-1, . . . , 80-8 are provided with a relative power setting per band.

By providing for a flexible and reconfigurable assignment of the carrier bundles CB1-1, CB1-2, CB1-3, CB1-4, CB2-1, CB2-2, CB2-3 from one or more of the base stations 5, 6 to different coverage areas, and hence different ones of the first coverage area modules 56-1, . . . , 56-M1 or the second coverage area modules 58-1, . . . , 58-M2 in the distribution system 40, the different carriers from the same base station 5, 6 can be routed to different remote units 80-1, . . . , 80-N. Similarly, different network operator signals from different base stations 5, 6 or individual carriers of the different network operator signals can be assigned to different carrier bundles CB1-1, CB1-2, CB1-3, CB1-4, CB2-1, CB2-2, CB2-3 and, therefore, routed differently.

Furthermore, the carrier bundle CB1-1 and CB1-3 of the base station 5—e.g. representing different cells of the base stations 5,6 station but addressing the same carrier frequencies—can be routed to the same coverage area with varying gain over time to support seamless handover when changing an assignment of the carrier bundle to a coverage module.

Figure 3A:
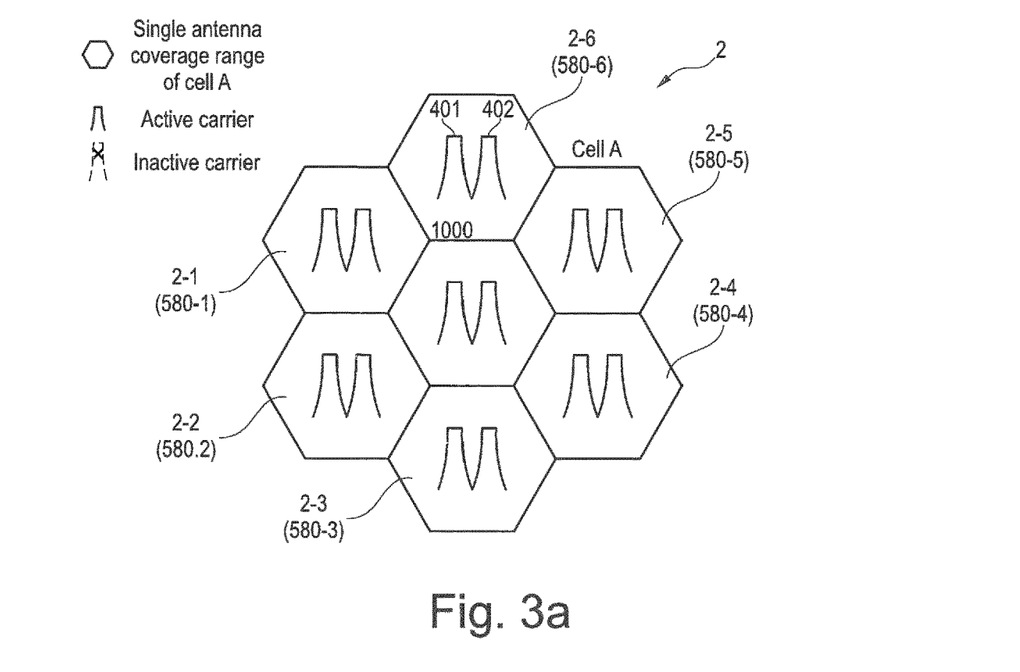
FIG. 3A-3C shows a cell distribution in different scenarios according to an embodiment of the present invention
Figure 3B:
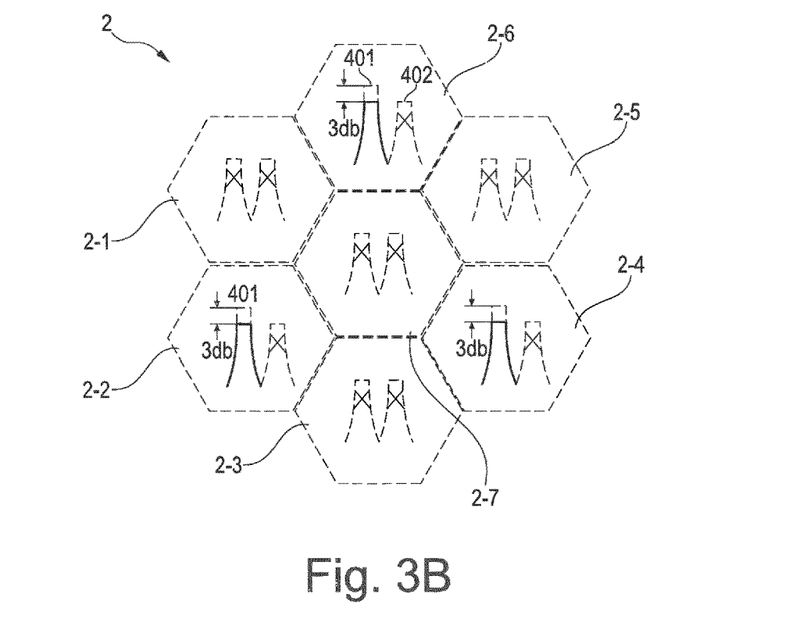
Figure 3C:
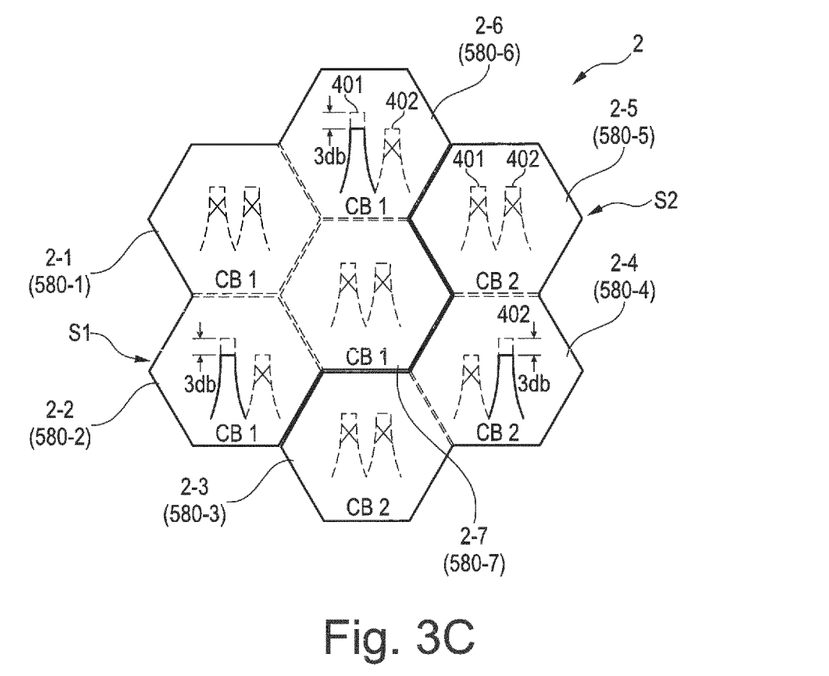
Figure 4A:
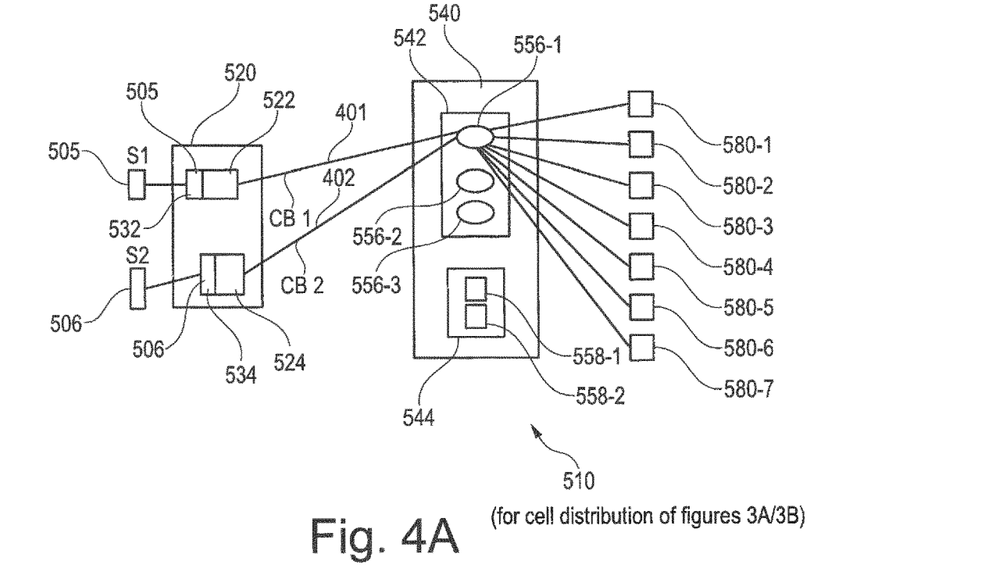
FIG. 4A-4B shows a system in different configurations providing for the different scenarios of FIG. 3A-3C according to an embodiment of the present invention.
Figure 4B:
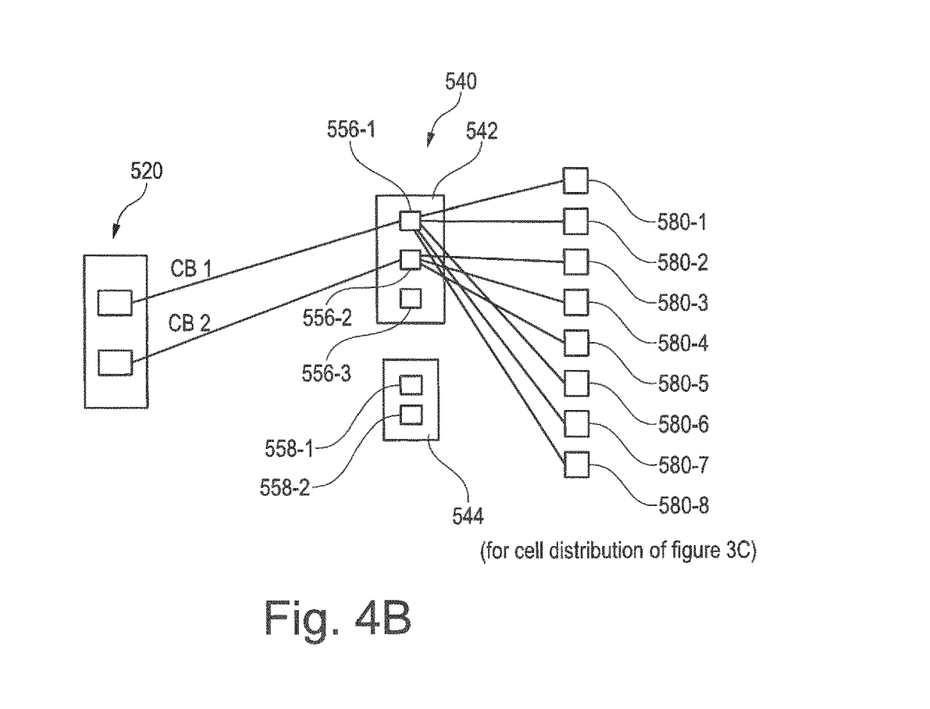

FIGS. 3A, 3B and 3C shows an example of signal distributions in a mobile system cell 2, and FIGS. 4A-4B shows a system 510 in different configurations providing for the different scenarios of FIGS. 3A-3C as an illustrative example of how the system of the present disclosure can be used and adjusted, depending on the capacity requirements and coverage requirements. For example, it is possible that during certain times of the day, e.g. night or at the weekend, then less capacity is required and some of the remote units can be switched off.

FIG. 3A shows the cell 2 in a dual carrier scenario with homogeneous capacity distribution. A dual carrier signal 400 comprises a first carrier 401 and a second carrier 402. The cell 2 comprises seven adjacent sub-cells 2-1 to 2-7. The sub-cells 2-1 to 2-7 are provided with the dual carrier signal 400 and are served by a corresponding remote units 580-1 to 580-7 (shown on FIG. 4A).

FIG. 4A shows a system 510 according to the present disclosure and having a homogeneous distribution of the dual carrier signal 400 into the cell 2. The system 510 relays the dual carrier signal 400 as a carrier bundle comprising the first carrier 401 and the second carrier 402 via a single antenna coverage area module connected to the seven remote units 580-1 to 580-7 to provide the coverage of cell 2.

The system 510 is arranged identically to that show and illustrated with respect to FIG. 1A and comprises the central hub 520 connected to the base stations 505, 506, and the distribution system 540 connected to the seven remote units 580-1, . . . , 580-8. The base stations 505, 506 are adapted for processing telecommunication signals to and from one or more network operators. It will be observed that like elements in FIG. 1A and FIG. 4 have a similar numbering, except that the reference number in FIG. 1A has been increased by 500 in FIG. 4.

The central hub 520 comprises a first hub module 522 connected to the first base station 505 and a second hub module 524 connected to the second base station 506.

The first hub module 522 and the second hub module 524 comprise respectively a first front end module 532 and a second front end module 534 for processing the first input signals S1 from the first base station 205 and the second input signals S2 from the second base station 506.

The first front end module 532 and the second front end module 534 are adapted to collect (step 200) the first input signals S1 and the second input signals S2, digitize (step 210) if required the first input signals S1 and the second input signals S2 and generate (step 220) respectively a first plurality of first carrier bundles CB1-1, . . . , CB-N1 out of the first input signals S1 and a second plurality of second carrier bundles CB2-1, . . . CB2-N2 out of the second input signals S2, In the example of FIG. 4A, the first carrier bundle CB1-1 comprising said first carrier 401 and second carrier 402 is formed by the first front end module 532 (step 220). The first carrier bundle CB1-1 is weighted (step 240) by an gain unit 536-1 and passed to a distribution system 540.

In an alternative embodiment, two carrier bundles may be formed (step 220). The first carrier bundle CB1-1 may comprise the first carrier 401 and a second carrier bundle CB1-2 may comprise the second carrier 401.

The connection between the central hub 520 and the distribution system 540 is in the digital domain and thus allows any kind of routing capability, any bundle carriers and an individual gain adjustment. An independent power adjustment (step 240) is provided for each of the carrier bundle.

The distribution system 540 comprises at least two expansion units 542, 544 connected to the plurality of remote units 580-1, . . . 580-7. The expansion units 542, 544 have respectively a first switch unit 552 and a second switch unit 554, followed by a digital-to-analog conversion module 562, 564.

The first switch unit 552 defines three first coverage area modules 556-1, . . . , 556-3, corresponding to the three coverage areas and the second switch unit defines two second coverage area modules, 558-1, 258-2. One of the coverage area modules 556-1, . . . , 556-3 and 558-1, 558-2 is associated to a coverage area.

The seven remote units 580-1, . . . , 580-7 of FIG. 4A are all connected to the first coverage area module 556-1 of the expansion module 540.

The carrier bundle CB1 is sent to the single coverage area module 556-1 of the expansion unit 542. This means that the carrier bundle CB1, after a digital-to analog conversion (step 250) provided in the expansion module 540, is passed to all of the seven remote units 580-1, . . . , 580-7 for relay (step 260).

Suppose now that the capacity demand is drastically reduced, for example at night. FIG. 3B shows the cell 2 with a modified distribution with respect the distribution shown on FIG. 3A. The cell of FIG. 3B comprises only three active sub-cells 2-2, 2-4, 2-6 in which only the single carrier 401 is present. The second carrier 402 is no longer active, i.e. not being broadcast and not carrying any information. Four of the sub-cells 2-1, 2-3, 2-5, 2-7 have been switched off. The three active sub-cells 2-2, 2-4, 2-6 are surrounded by inactive sub-cells 2-1, 2-3, 2-5, 2-7.

The distribution of FIG. 3B can be obtained by switching off the second carrier 402 in the corresponding ones of the remote units 580-2, 580-4, 580-6 covering the sub-cells 2-2, 2-4, 2-6. There is only one active carrier 401 in the remaining active sub-cells 2-1, 2-3, 2-5, 2-7, and the resulting power headroom may be used to cover the adjacent antenna coverage areas as well. The adjacent remaining remote units 580-1, 580-3, 580-5, 580-7 are switched off.

FIG. 3C shows an alternate distribution to the distribution shown in FIG. 3A.

The cell 2 of FIG. 3C comprises a first active first carrier sub-cell provided with a signal 405 comprising the single carrier 401, and two active second carrier sub-cells provided with a signal 406 comprising the single carrier 402. The four adjacent sub-cells 2-1, 2-3, 2-5, 2-7 have been switched off, similarly to the cells of FIG. 2B. The active sub-cells 2-2, 2-4, 2-6 are surrounded by inactive sub-cells 2-1, 2-3, 2-5, 2-7.

The distribution of FIG. 3C can be obtained by reconfiguring the system 510, as shown in FIG. 4B. Two coverage areas are used, i.e. two coverage area modules 556-1, 556-2 in the distribution module 540 are used. The four corresponding remote units 580-1, 580-2, 580-7, 580-6 are assigned to the first coverage area module 556-1. The other three remote units 580-3, 580-4, 508-5 are assigned to the second coverage area module 556-2.

Alternately, the remote units 580-1, 580-2, 580-7, 580-6 can be assigned to the first coverage module 556-1 and the other three remote units 580-3, 580-4, 580-5 are assigned to the second coverage area module 556-2 from the very beginning and this assignment is not changed. The carrier bundle CB1 may be, in a first step, assigned to both of the coverage area modules 556-1, 556-2, and then assigned to the first coverage area module 556-1, whilst the second carrier bundle CB2 is assigned to the second coverage module 556-2 . . . .

A first carrier bundle CB1 with a single carrier 401 is assigned to the first coverage area, and hence to the first coverage area module 556-1. The first carrier bundle CB1 is therefore relayed to the corresponding four remote units 580-1, 580-2, 580-7, 580-6.

A second carrier bundle CB2 with a second carrier 402 is passed to the second coverage area module 556-2. The second carrier bundle CB2 is relayed to the corresponding remote units 580-3, 580-4, 508-5.

Similarly to the cell distribution of FIG. 3B, it is possible, should the capacity be reduced, to use the power headroom resulting from the use of only one of the carrier 401 or the carrier 402 in the coverage areas to cover the adjacent subcells as well.

The skilled person will understand that applying the different single carrier signals 401, 402 allows improvement of the uplink noise figure in the active sub-cells by either using different single carriers and/or by combining less active remote unit uplink signals.

The examples of FIGS. 3A-3C are not intended to limit the invention but are only given to show how the individual power settings per remote unit and independent signal assignments to each remote units, via coverage areas, allows adjusting the system to the capacity. This in turn results in power savings.

Figure 5A:
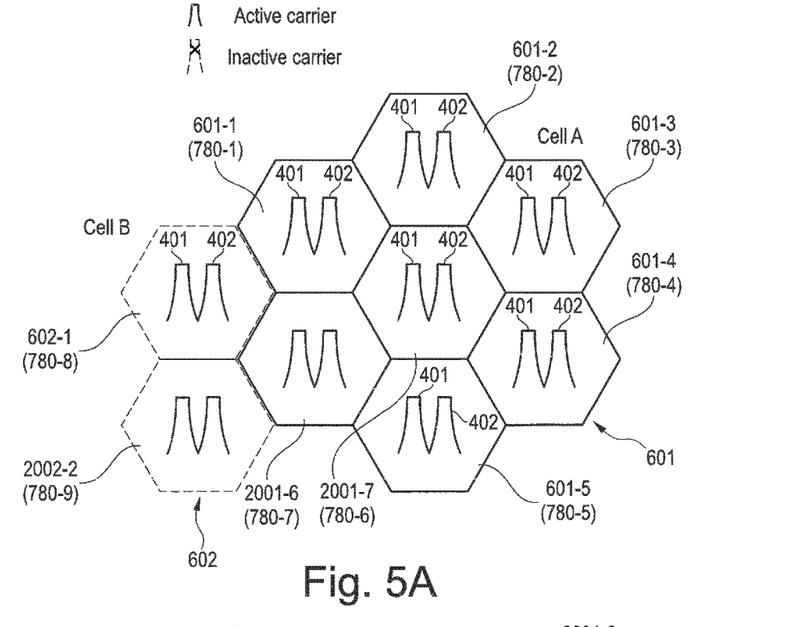
FIG. 5A-5B shows a cell distribution in different scenarios according to an embodiment of the present invention
Figure 5B:
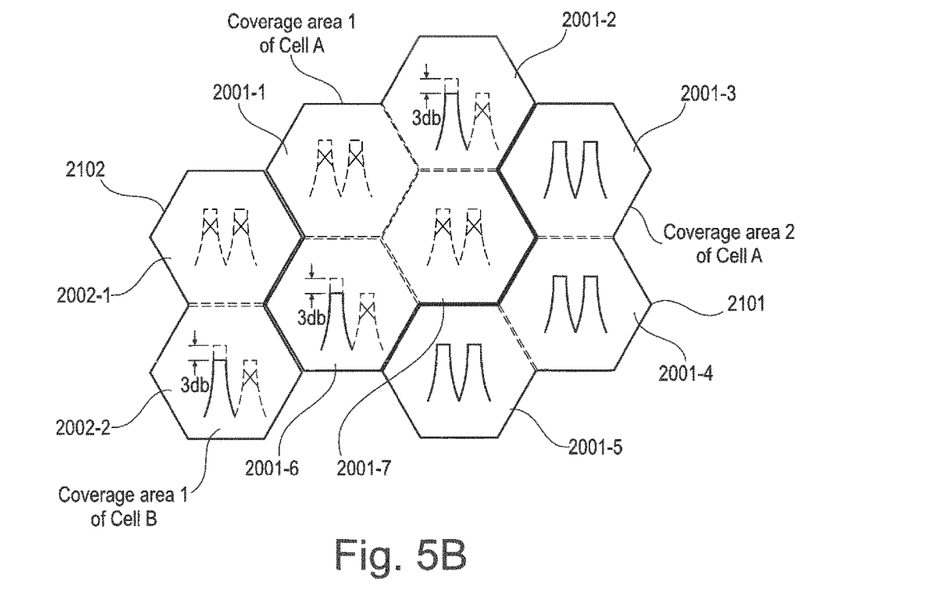
Figure 6A:
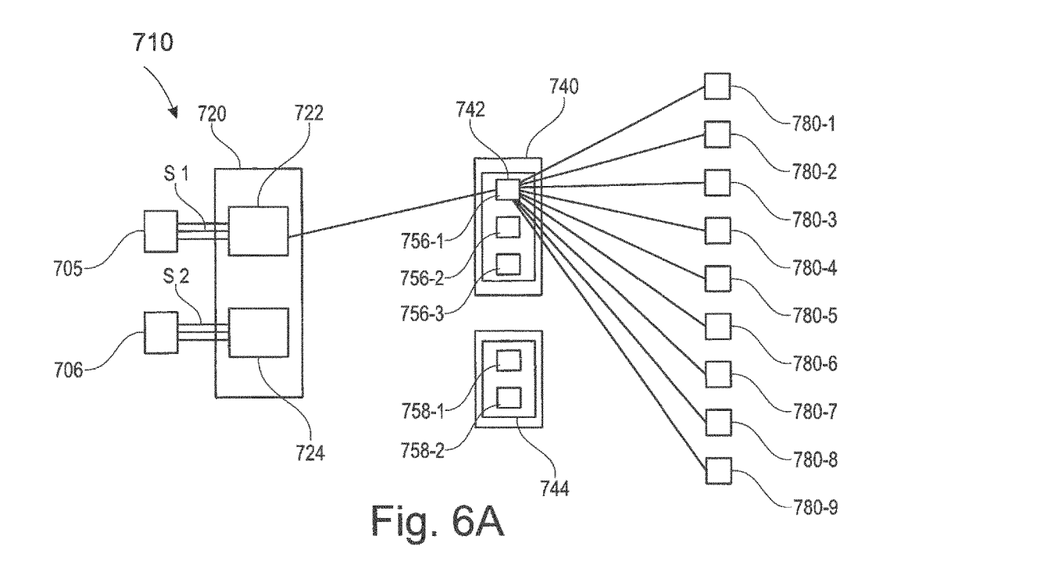
FIG. 6A-6B shows a system in different configurations providing for the different scenarios of FIG. 5A-5B according to an embodiment of the present invention.
Figure 6B:
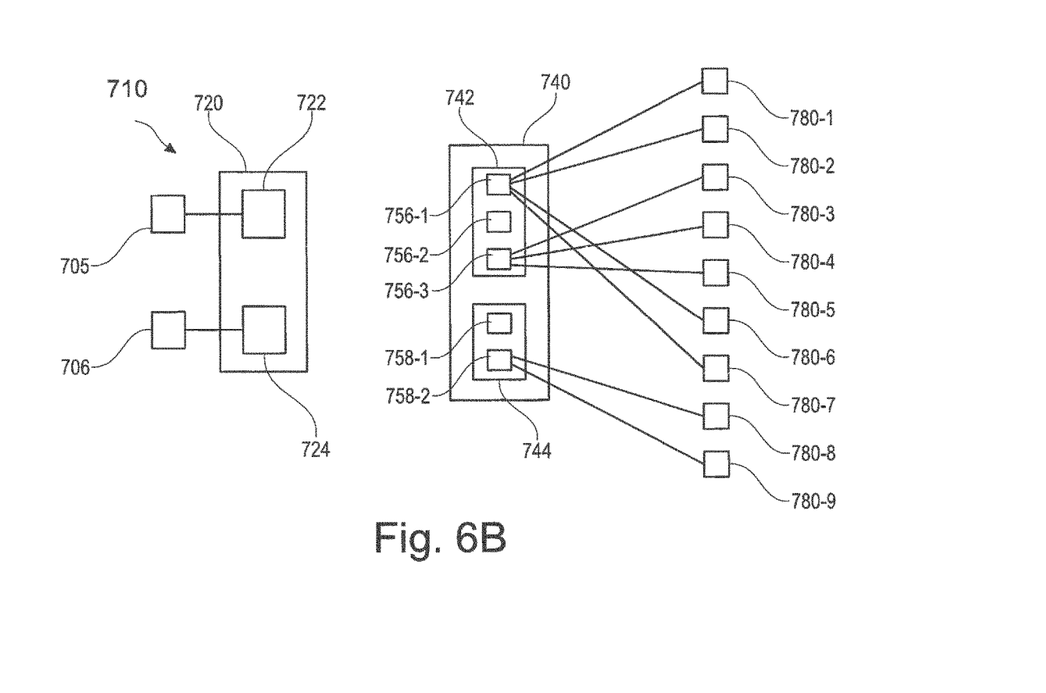

FIGS. 5A-5B show another example of signal distributions in a first cell 601(A) and a second cell 602(B), and FIGS. 6A-6B a system 710 configured to obtain the corresponding the signal distributions of FIGS. 5A-5B.

The first cell 601 has a first dual carrier signal 400 comprising a first carrier 401 and a second carrier 402. The first cell 601 comprises seven adjacent first sub-cells 601-1 to 601-7 each covered by seven first remote units 780-1 to 780-7 (shown on FIG. 7A). The first cell 601 relays the dual carrier signal 400. The second cell 601 has a second dual carrier signal 400 comprising a first carrier 401 and a second carrier 402. The second cell 601 comprises two adjacent sub-cells 602-1 to 602-2, which are covered by two second remote units 780-8, 80-9.

The system 710 is similar to that of FIG. 3 and will not be described in detail here, except to note that there are nine remote units 780-1, . . . , 780-9. Identical reference numerals are used to indicate identical elements, except that the numbers have been increased by 200.

In the example of FIG. 6A, a first carrier bundle CB1-1 comprising the first carrier 501 and the second carrier 402 is formed by the first front end module 732. The carrier bundle CB1-1 is amplified by a gain unit 736-1 digitally connected to a distribution system 740.

In an alternative embodiment, two carrier bundles may be formed. A first carrier bundle comprises the first carrier 401 and a second carrier bundle comprises the second carrier 402.

The first switch unit 752 provides three first coverage area modules 756-1, . . . , 756-3, corresponding to three coverage areas, and the second switch unit 754 defines two second coverage area modules 758-1, 758-2.

The nine remote units 780-1, . . . , 780-9 of FIG. 6 are all connected to a single coverage area module, e.g. to the first coverage module 756-1 of the expansion module 740.

The carrier bundle CB1 is sent to the single coverage area module 756-1 of the expansion module 740. This means that the carrier bundle CB1, after a digital-to analog conversion provided in the expansion module 740, is passed to the nine remote units 780-1, . . . , 780-9.

Suppose now that the capacity demand is reduced, for example at night. FIG. 5B shows the cells 601 and 602 with a modified distribution with respect the distribution shown on FIG. 5A.

Two coverage areas 2100, 2101 are used for the first cell 601. The first coverage area 2100 correspond to an area covered by the first, second, sixth to seventh remote units 780-1, 780-2, 780-6, 780-7. The second coverage area 2101 corresponds to an area covered by the third to fourth remote units 780-3 to 780-5.

The first remote unit 780-1, the second remote unit 780-2, the sixth remote unit 780-6 and the seventh remote unit 780-7 are connected to the first coverage area module 756-1 in the distribution module 740. The third remote unit 780-3, the fourth remote units 780-4 and the fifth remote unit 780-5 are connected to the third coverage area module 756-3, as a non limiting example.

A first carrier bundle CB1 with a single carrier 401 is assigned to the first coverage area 2100 and hence to the first coverage area module 756-1. The first carrier bundle CB1 is therefore relayed to the first remote unit 780-1, the second remote unit 780-2, the sixth remote unit 780-6 and the seventh remote unit 780-7.

A second carrier bundle CB2 with the first carrier 401 and the second carrier 401 is assigned to the second coverage area 2101, and hence to the third coverage area module 756-1. The second carrier bundle is relayed to the corresponding remote units 780-3, 780-4, 780-5.

A third coverage area 2102 is used for the second cell 602. The eighth remote unit 780-8 and the ninth remote unit 780-9 are connected to the coverage area module 758-1 of the expansion module 740. A third bundle CB3 is passed to the coverage area module 258-1 and relayed to the eighth remote unit 780-8 and the ninth remote unit 780-9.

Similarly to the cell distribution of FIG. 3B, it is possible, should the capacity be reduced to use the power headroom resulting from the use of only one of the carriers 401 or 402 in the coverage areas to cover the adjacent subcells as well.

A dedicated amount of capacity (e.g. one carrier) may be provided to certain parts of the total coverage area of the entire system or to the corresponding cell of the base station to which the multi-carrier signal was assigned.

Similarly, interference reduction at cell borders may be obtained by using different carriers in portions of the system coverage area which are close to a cell border compared to other portions in a center of the cell where all carriers can be used.

It will be appreciated that the re-configuration of the coverage areas and power illustrated in FIGS. 3 to 6 apply to the downlink connection. The uplink connection may be kept switched on to ensure that a connection can be made to any mobile station entering the cell 2 or one of the subcells 2-1 to 2-7, or to determine or detect any uplink activity which could be used to trigger the capacity rerouting. In case of time/calendar based capacity rerouting, the uplink could remain switched off. The detection of the uplink activity is only needed, if the uplink is used to re-configure the coverage areas.

A processing unit is adapted to manage the routing, e.g. based on a calendar based function or based on available information about locally changing capacity demands within a cell or based on uplink activity detection by scanning the uplink power and/or analyzing the uplink spectrum per remote unit or groups of remote units.

While various embodiments of the present invention have been described above, it should be understood that they have been presented by way of example, and not limitation. It will be apparent to persons skilled in the relevant arts that various changes in form and detail can be made therein without departing from the scope of the invention.

The invention claimed is:

1. A system for relaying telecommunication signals, comprising:
    a central hub connectable to one or more base stations;
    a plurality of remote units for relaying the telecommunication signals; and
    a plurality of expansion units digitally connected to the central hub and connect-able to the plurality of remote units,
    wherein at least one of the plurality of expansion units is provided with a plurality of coverage area modules, wherein one or more of the plurality of remote units is connected to a selected one of the plurality of coverage area modules, the selected one of the coverage area modules being adapted to relay same signals to the connected one or more of the plurality of remote units,
    wherein a connection between the plurality of expansion hubs and the plurality of remote units is reconfigurable, and so that at least one of the remote units may be connected from a first selected one of the coverage area modules, to a second selected one of the coverage area modules.

2. The system of claim 1, wherein relayed signals are digital wideband signals.

3. The system of claim 1 or 2, wherein a digital-to analog converter is located at least one of the plurality of remote units to convert relayed signals from a digital format to an analog format.

4. The system according to claim 1, wherein a number of coverage area modules is less than a number of remote units.

5. The system of claim 1, wherein the central hub is adapted to define at least one carrier bundle from ones of the telecommunication signals and to pass the at least one carrier bundle to at least one of the coverage areas modules.

6. The system of claim 1, further comprising a plurality of gain units (for weighting the relative gain of signals between the central hub (20; 520) and the plurality of expansion units.

7. A method for relaying telecommunication signals comprising the steps of:
    receiving telecommunications signals from at least one network operator by a central hub;
    generating one or more carrier bundles of the telecommunications signals in the central hub;
    passing the one or more defined carrier bundles to a plurality of expansion units, wherein the plurality of expansion units are digitally connected to the central hub and connectable to the plurality of remote units provided with a plurality of coverage area modules, wherein at least one of the plurality of expansion units is provided with a plurality of coverage area modules, wherein one or more of the plurality of remote units is connected to a selected one of the plurality of coverage area modules, the selected one of the coverage area modules being adapted to relay same signals to the connected one or more of the plurality of remote units;
    associating a passed one of the defined carrier bundles with an associated coverage areas; and
    passing the carrier bundle to remote units for relaying of the radio signals to the associated coverage area,
    reconfiguring a connection between the plurality of expansion units and the plurality of remote units, so that at least one of the remote units is connected to a first selected one of the coverage area in a first configuration and is connected to a second selected one of the coverage area in a second configuration.

8. The method of claim 7, wherein the associating of the passed one of the defined carried bundles with an associated coverage area is carried out in the digital domain.

9. The method of claim 7 or 8, wherein at least one of the carrier bundles (comprise telecommunications signals from a plurality of the network operators.

10. The method of claim 7, further comprising applying a relative gain to at least one of the carrier bundles.

11. The method of claim 7, further comprising applying a gain to relayed radio signals.

12. The method of claim 7, further comprising digital to analog conversion of the carrier bundle in the remote units.

* * * * *

UNITED STATES PATENT AND TRADEMARK OFFICE
CERTIFICATE OF CORRECTION

PATENT NO. : 10,116,376 B2
APPLICATION NO. : 15/503303
DATED : January 22, 2019
INVENTOR(S) : Weckerle et al.

Page 1 of 1

It is certified that error appears in the above-identified patent and that said Letters Patent is hereby corrected as shown below:

In the Specification

Column 2, Line 36, "the signal can be /[MW1] combined" should read -- the signal can be combined --;

Column 8, Line 2, "digital wideband /[MW2] signals" should read -- digital wideband signals --.

Signed and Sealed this
Nineteenth Day of February, 2019

Andrei Iancu
*Director of the United States Patent and Trademark Office*